US012436373B2

United States Patent
Ritschel et al.

(10) Patent No.: US 12,436,373 B2
(45) Date of Patent: Oct. 7, 2025

(54) FLUORESCENCE MICROSCOPE SYSTEM AND METHOD

(71) Applicant: Leica Microsystems CMS GmbH, Wetzlar (DE)

(72) Inventors: Kai Ritschel, Wetzlar (DE); Benjamin Deissler, Wetzlar (DE); Dennis Jaehnert, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 436 days.

(21) Appl. No.: 18/057,773

(22) Filed: Nov. 22, 2022

(65) Prior Publication Data

US 2023/0161143 A1  May 25, 2023

(30) Foreign Application Priority Data

Nov. 23, 2021 (EP) .................................. 21209766

(51) Int. Cl.
*G02B 21/00* (2006.01)
*G01N 21/01* (2006.01)
*G01N 21/64* (2006.01)

(52) U.S. Cl.
CPC ..... *G02B 21/0076* (2013.01); *G01N 21/6458* (2013.01); *G01N 2021/0106* (2013.01)

(58) Field of Classification Search
CPC .............. G02B 21/0076; G02B 21/008; G02B 21/0064; G02B 21/365; G01N 21/6458; G01N 2021/0106
See application file for complete search history.

(56) References Cited

U.S. PATENT DOCUMENTS

| 7,304,733 B2 | 12/2007 | Neher et al. |
| 8,664,623 B2 | 3/2014 | Webb et al. |

(Continued)

FOREIGN PATENT DOCUMENTS

DE  10222359 B4  1/2005

OTHER PUBLICATIONS

Dickinson, M. E. et al.; "Multi-Spectral Imaging and Linear Unmixing Add a Whole New Dimension to Laser Scanning Fluorescence Microscopy"; *BioTechniques*; Dec. 31, 2001; pp. 1272-1278; vol. 31, No. 6; Taylor & Francis; Abingdon, UK.

(Continued)

*Primary Examiner* — Charles S Chang
(74) *Attorney, Agent, or Firm* — LEYDIG, VOIT & MAYER, LTD.

(57) ABSTRACT

A fluorescence microscope system for imaging a sample having at least two different fluorophores includes an illumination system configured to emit illumination light for exciting the fluorophores; an optical detection system configured to generate images of the sample based on fluorescence light emitted by the excited fluorophores; and a control unit configured to determine whether to image the sample in a concurrent imaging mode or in a sequential imaging mode, based on at least one characteristic of each of the fluorophores and based on at least one parameter of the optical detection system and/or the illumination system. In the concurrent imaging mode, the fluorophores are imaged simultaneously, and in the sequential imaging mode, the fluorophores are divided into a first group and at least one second group, and fluorophores of the first group and the at least one second group are imaged subsequently.

15 Claims, 6 Drawing Sheets

(56) References Cited

U.S. PATENT DOCUMENTS 10,768,105 B1 9/2020 Mohan et al.
11,487,097 B1 * 11/2022 Park ..................... G02B 21/16

OTHER PUBLICATIONS

Hibbs, Alan R. et al.; "Practical Confocal Microscopy"; *Handbook of Biological Confocal Microscopy—Third Edition*; Jun. 2, 2006; pp. 650-667; Chapter 36; Springer Science+Business Media, LLC; New York City; NY, USA.
Neher, R. et al.; "Optimizing Imaging Parameters for the Separation of Multiple Labels in a Fluorescence Image"; *Journal of Microscopy*; Jan. 1, 2004; pp. 46-62; vol. 213, No. 1; John Wiley & Sons, Inc.; Hoboken, NJ, USA.
Zimmermann, Timo; "Spectral Imaging and Linear Unmixing in Light Microscopy"; *Advances in Biomedical Engineering/Biotechnology*; Jan. 1, 2005; pp. 245-265; vol. 95; Springer-Verlag; Berlin-Heidelberg, Germany.

* cited by examiner

FLUORESCENCE MICROSCOPE SYSTEM AND METHOD

CROSS REFERENCE TO RELATED APPLICATIONS

This application claims benefit to European Patent Application No. EP 21209766.1, filed on Nov. 23, 2021, which is hereby incorporated by reference herein.

FIELD

The invention relates to a fluorescence microscope system for imaging a sample. The invention further relates to a method for imaging a sample comprising at least two different fluorophores using a fluorescence microscope system.

BACKGROUND

When a sample is prepared with more than one fluorophore, each fluorophore is often recorded individually. Since imaging different fluorophores may require a change of filters and modifying or switching a light source, a lot of time passes between the acquisition of different images. However, in many applications this is undesirable. Therefore, known microscope systems exist which are capable of exciting and detecting two or more fluorophores simultaneously by means of multiple excitation light sources and detectors. However, cross excitation among the fluorophores and non-linear effects like bleaching due to high intensity illumination, among others, can seriously affect the image quality.

SUMMARY

In an embodiment, the present disclosure provides a fluorescence microscope system for imaging a sample including at least two different fluorophores. The fluorescence microscope system includes an illumination system configured to emit illumination light for exciting the at least two different fluorophores; an optical detection system configured to generate images of the sample based on fluorescence light emitted by the excited at least two different fluorophores; and a control unit configured to determine whether to image the sample in a concurrent imaging mode or in a sequential imaging mode, based on at least one characteristic of each of the at least two different fluorophores and based on at least one parameter of the optical detection system and/or at least one parameter of the illumination system. In the concurrent imaging mode, the at least two different fluorophores are imaged simultaneously, and in the sequential imaging mode, the at least two different fluorophores are divided into a first group and at least one second group, and fluorophores of the first group and fluorophores of the at least one second group are imaged subsequently.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
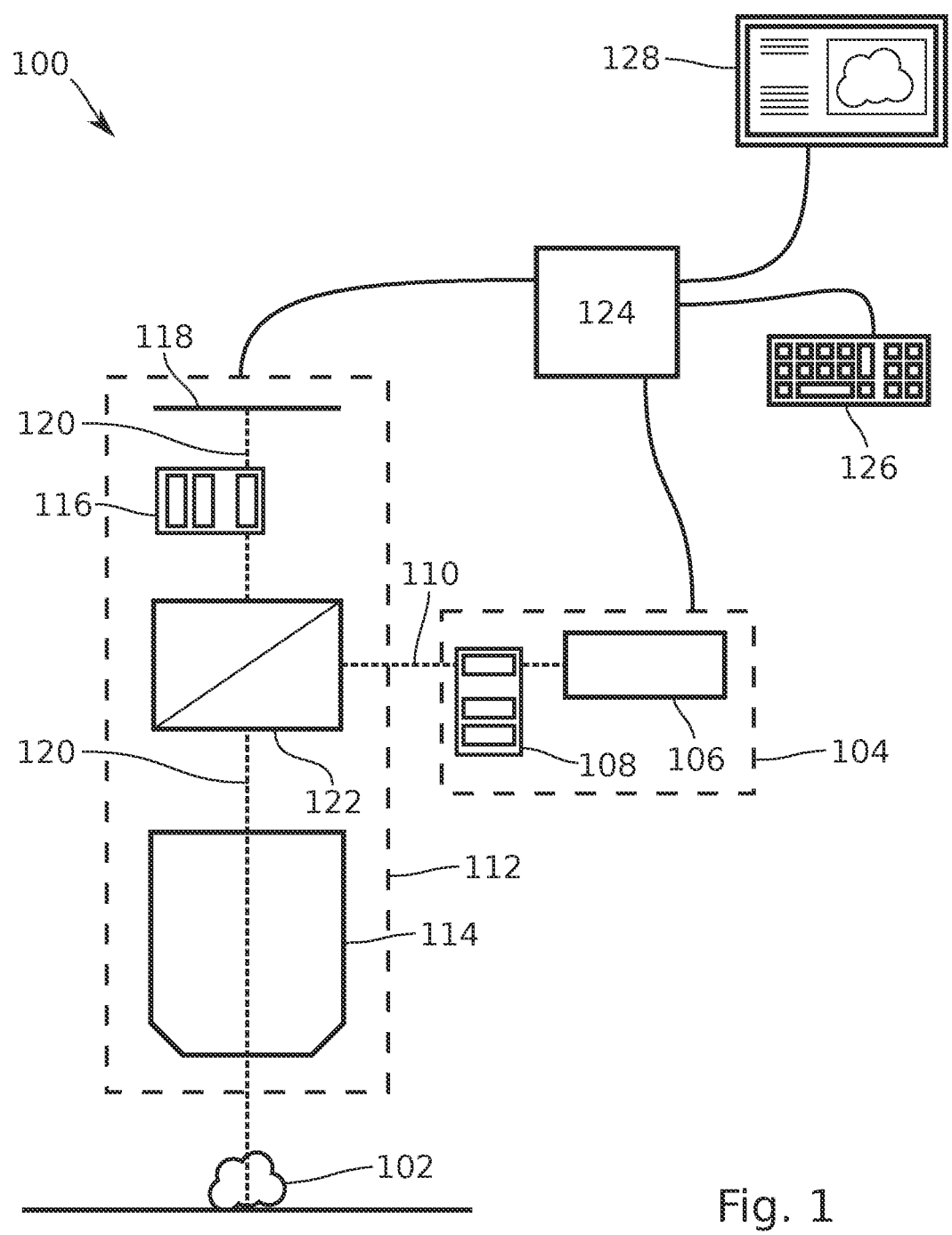
FIG. 1 is a schematic drawing of a fluorescence microscope system for imaging a sample according to an embodiment.

Embodiments of the present invention provide a fluorescence microscope system and a method for imaging a sample comprising at least two different fluorophores that allows for the acquisition of high quality images.

An embodiments of the proposed fluorescence microscope system for imaging a sample comprising at least two different fluorophores comprises an illumination system configured to emit illumination light for exciting the fluorophores, and an optical detection system configured to generate images of the sample based on fluorescence light emitted by the excited fluorophores. The fluorescence microscope system further comprises a control unit configured to determine whether to image the sample in a concurrent imaging mode or in a sequential imaging mode based on at least one characteristic of each of the different fluorophores and based on at least one parameter of the optical detection system and/or at least one parameter of the illumination system. In the concurrent imaging mode, the different fluorophores are imaged simultaneously. In the sequential imaging mode, the different fluorophores are divided into a first group and at least one second group, and the fluorophores of the first and second groups are imaged subsequently.

A characteristic of each of the different fluorophores may in particular be one of the following: an excitation spectrum, an emission spectrum, a brightness, and a concentration of the fluorophore inside the sample. A parameter of the optical detection system may in particular be one of the following: a magnification, a numerical aperture, a detector gain, a detector exposure time, a scan speed, a pinhole size, an amount of detector averaging, a detector directionality, a detection spectrum, a detection filter setting, and an imaging modality, for example confocal or widefield imaging. A parameter of the illumination system may in particular be one of the following: a light source power, a light source spectrum, and an excitation filter setting.

The control unit can assist a user of the fluorescence microscope system in imaging the sample by taking into account any number of these parameters in order to decide whether to image the sample in the concurrent imaging mode or in the sequential imaging mode. In particular, the control unit checks for common causes of errors in simultaneous excitation and imaging of fluorophores, for example cross excitation, over excitation, and overlap of emission spectra. The control unit also ensures that an imaging mode is chosen which allows acquired image data to be processed automatically, for example by spectral unmixing. Further, the preparation and staining of the sample, the exposure time of the fluorophores or even the expression of certain proteins in the sample all have an influence on the behavior of the fluorophores. Thus, by adapting the imaging mode to the specific sample and the current imaging parameters of the microscope system, high quality images can be acquired without requiring special know-how on the part of the user.

In a preferred embodiment, the control unit is configured to divide the different fluorophores into the first group and the at least one second group based on at least one characteristic of each of the different fluorophores. In this embodiment, the different fluorophores are divided into different groups. The fluorophores within the different groups are excited simultaneously while the different groups are excited subsequently. By dividing the fluorophores based on at least one characteristic, this embodiment can prevent unwanted effects that negatively affect the image quality, for example cross-excitation and over-excitation. For example, by grouping the fluorophores based on their excitation and emission spectra, undesirable cross-excitation is prevented. Likewise, the drowning out of less bright fluorophores can be prevented, if the fluorophores are grouped by their brightness. In this embodiment, as many fluorophores as possible are imaged together to shorten the duration of image acquisition while ensuring a high image quality.

In another preferred embodiment, the control unit is configured to divide the different fluorophores into the first group and the at least one second group such that the emission spectra of the different fluorophores within each group have a minimal overlap. In this embodiment, the different fluorophores within each group can easily be separated by means of spectral unmixing. Thereby, crosstalk between different fluorophores is minimized. This allows the sample to be imaged with high spectral quality.

In another preferred embodiment, the control unit is configured to determine a minimum value and/or a maximum value of a power of at least one light source of the illumination system based on at least one characteristic of each of the different fluorophores and/or at least one characteristic of the sample, and to determine whether to image the sample in a sequential imaging mode or in a concurrent imaging mode by comparing a working range of the light source power to the minimum value and/or the maximum value. The minimum value can be determined for example from the minimum power needed to excite the different fluorophores. The maximum value can be determined based on the power needed to bleach one or more of the different fluorophores.

For example, the sample comprises two fluorophores A and B that can be excited by different light sources. Due to errors in staining, the fluorophore A is only very weakly stained and requires a lot of energy for excitation, whereas the fluorophore B is very strongly stained and responds very well to excitation. The user opts for confocal imaging and uses an auto illumination setting. The auto illumination setting will, due to the strongly different dynamics of the fluorophores, result in one light source to be set to the maximum and the other light source to be set to the minimum. As a result of cross excitation, neither fluorophore A nor B are optimally excited and the control unit will suggest the sequential imaging mode.

In this embodiment the control unit determines whether or not the power necessary to excite but not bleach the different fluorophore is within the working range of the light source or light sources used. In other words, the control unit is configured to determine whether to image the sample in a sequential imaging mode or in a concurrent imaging mode based on a dynamic range of at least one light source of the illumination system.

In another preferred embodiment, the control unit is configured to determine whether to image the sample in a sequential imaging mode or in a concurrent imaging mode based on the excitation spectra of the different fluorophores. For example, when the excitation spectra of the different fluorophores overlap significantly, the different fluorophores can be excited by the same excitation light, and thus can be excited at the same time. When the excitation spectra of the different fluorophores are vastly differently, two or more light sources might be needed. However, the excitation of multiple fluorophores may also be unwanted, in particular when there is also significant overlap of the emission spectra of the fluorophores. This is undesirable, because the different fluorophores are then hard to separate during spectral unmixing or using a filter setup. Thus, in the embodiment, the control unit may also check whether a strong overlap may happen by comparing the spectra of the different fluorophores, for example by calculating an overlap integral, a Euclidean distance or a spectral angle and comparing the result with a predetermined threshold. Thus, this embodiment facilitates spectral unmixing, and therefore further enhances the image quality.

In another preferred embodiment, the control unit is configured to determine whether to image the sample in a sequential imaging mode or in a concurrent imaging mode based on a spectrum of excitation light emitted by the illumination system. In the embodiment, the spectrum of the excitation light is in particular determined by the light source and/or the excitation filter setting. The spectrum of excitation light determines which of the different fluorophores can be excited. When there is not enough overlap between the spectrum of excitation light and the excitation spectrum of a particular fluorophore, that particular fluorophore might not be excited by the excitation light. Choosing the right excitation light source and/or excitation filter setting for each fluorophore is therefore advantageous. Thus, imaging some of the different fluorophore subsequently in order to change the excitation light source and/or excitation filter setting between concurrent image acquisitions may be advantageous.

In another preferred embodiment, the control unit is configured to determine whether to image the sample in a sequential imaging mode or in a concurrent imaging mode by comparing the excitation spectra of the different fluorophores to a spectrum of excitation light emitted by the illumination system. In the embodiment, the control unit checks whether the light source or light sources "overexcite" one of more of the fluorophores. This "over-exciting" can lead to bleaching of the sample due to non-linear effects and detector saturation, and thus to a rapid degrading of the image quality if not taken into account.

In another preferred embodiment, the control unit is configured to determine whether to image the sample in a sequential imaging mode or in a concurrent imaging mode based on the emission spectra of the different fluorophores. A significant overlap in emission spectra of some of the fluorophores makes it harder to separate these particular fluorophores, especially if they are located close to each other. By imaging these particular fluorophores subsequently, the fluorophores can be unambiguously identified, thereby enhancing the image quality.

In another preferred embodiment, the control unit is configured to determine whether to image the sample in a sequential imaging mode or in a concurrent imaging mode by comparing the overlap of the emission spectra of the different fluorophores to a detection spectrum of the optical detection system. The detection spectrum is in particular determined by the type of detector used and/or the detection filter setting. When there is a significant overlap of two or more emission spectra of the different fluorophores within the detection spectrum of the optical detection system, cross-excitation occurs. Thus, it might be advantageous to image some of the different fluorophore subsequently in order to facilitate spectral unmixing and enhance the image quality.

In another preferred embodiment, the control unit is configured to determine whether to image the sample in a sequential imaging mode or in a concurrent imaging mode by comparing a brightness value of at least two of the different fluorophores. The brightness value may for example be a maximum value per fluorophore channel, a percentile score per fluorophore channel or mean value per fluorophore channel. Less bright fluorophores can easily be drowned out by more bright fluorophores. In this embodiment, the control unit checks whether one or more fluorophores are significantly less bright than other fluorophores and determines the imaging mode accordingly.

In particular, the control unit can be configured to determine the brightness value based on a measured brightness value measured by the optical detection system. In other words, in this embodiment, the brightness of a particular fluorophore is determined in-situ. The brightness of some fluorophores varies widely with factors like the preparation the sample and the concentration of the fluorophores. Thus, the determination of the brightness in-situ is much more reliable than the use of a predetermined value.

In another preferred embodiment, the control unit is configured to determine whether to image the sample in a sequential imaging mode or in a concurrent imaging mode based on a dynamic range of at least one detector of the optical detection system. The dynamic range is determined by the detector type and in part by the detection filter setting. Thus, the dynamic range determines which of the different fluorophores can be detected by the optical detection system such that all fluorophores have a sufficient signal brightness, signal to noise ratio without saturating any detectors of the optical detection system. It is therefore advantageous to choose the right detector and/or detection filter setting for each fluorophore or group of fluorophores. Thus, it might be advantageous to image some of the different fluorophore subsequently in order to change the detector and/or detection filter setting between concurrent image acquisitions.

In another preferred embodiment, in the sequential imaging mode the illumination system subsequently emits first illumination light for exciting the fluorophores of the first group and at least one second illumination light for exciting the fluorophores of the second group; and wherein in the concurrent imaging mode the illumination system emits third illumination light for exciting the different fluorophores simultaneously. In this embodiment, the different imaging modes are also characterized by a different illumination, i.e. different combination of illumination wavelengths or intensities. In the sequential imaging mode different illumination lights are used to excite the first and second groups of fluorophores. In the concurrent imaging mode, the first and second groups of fluorophores are excited by the same illumination light.

In another preferred embodiment, the control unit is configured to determine whether to image the sample in a sequential imaging mode or in a concurrent imaging mode based on at least one characteristic of the sample. A characteristic of the sample may in particular be one of the following: a type of the sample and a concentration of the fluorophores inside the sample. These characteristics, among others, influence the behavior of the fluorophores, in particular the brightness, the excitation spectrum and the emission spectrum. By taking these factors in to account, the decision what imaging mode to use can be made more reliably.

In another preferred embodiment, the control unit is configured to set at least one parameter of the optical detection system and/or at least one parameter of the illumination system based on at least one characteristic of each of the different fluorophores and/or at least one characteristic of the sample. In this embodiment, the control unit is configured to assist the user in setting the parameters such that the different fluorophores can be imaged at the same time if possible. Otherwise the control unit will set the parameters such that the different fluorophores can be imaged in as few subsequent acquisitions as possible. By assisting the user, the microscope system ensures a high image quality without requiring an experienced user.

In another preferred embodiment, the control unit is configured to give a feedback to a user when the control unit has determined that the sample is to be imaged in the sequential imaging mode for example based on imaging settings entered by the user, for example a target for brightness or signal to noise ratio. In this embodiment the user is informed that the sample should not be imaged in the concurrent imaging mode with the imaging settings, i.e. the parameters of the optical detection system and/or the parameters of the illumination system. The user may then proceed with imaging in the concurrent imaging mode, switch to imaging in the subsequent imaging mode or change the imaging settings.

Embodiments of the present invention may further relate to a method for imaging a sample comprising at least two different fluorophores using a fluorescence microscope system comprising the following steps: determining whether to image the sample in a concurrent imaging mode or in a sequential imaging mode based on at least one characteristic of each of the different fluorophores and based on at least one parameter of an optical detection system of the fluorescence microscope system and/or at least one parameter of an illumination system of the fluorescence microscope system; imaging the different fluorophores simultaneously when it was determined that the sample is to be imaged in the concurrent imaging mode; dividing the different fluorophores into a first group and at least one second group; and imaging the fluorophores of the first and second groups subsequently when it was determined that the sample is to be imaged in the sequential imaging mode.

The method has the same advantages as the fluorescence microscope system and can be supplemented using the features of various embodiments directed at the sample carrier and the imaging system.

FIG. 1 is a schematic drawing of a fluorescence microscope system 100 for imaging a sample 102 according to an embodiment.

An illumination system 104 of the fluorescence microscope system 100 is configured to generate different excitation lights for exciting different fluorophores located inside the sample 102. The illumination system 104 according to the present embodiment comprises a white light source 106, and a first interchangeable filter unit 108. The white light source 106 emits white light towards the first interchangeable filter unit 108 into an illumination beam path 110. The first interchangeable filter unit 108 comprises two or more filters which block all wavelengths of the white light except for a single wavelength or a range of wavelengths in order to generate different excitation lights. One of the filters at a time is brought into the illumination beam path 110 by the first interchangeable filter unit 108 to produce a specific excitation light that is further directed along the illumination beam path 110. An excitation filter setting defines which of the filters is currently brought into the illumination beam path 110, i.e. which specific excitation light is generated.

In an alternative embodiment, the illumination system 104 may comprise two or more different light sources. Each of the different light sources is configured to generate a specific excitation light and to direct the specific excitation light into the illumination beam path 110. In this alternative embodiment, the first interchangeable filter unit 108 may be omitted.

An optical detection system 112 of the fluorescence microscope system 100 is configured to generate images of the sample 102 based on fluorescence light emitted by the excited fluorophores. The optical detection system 112 according to the present embodiment comprises an objective 114 directed at the sample 102, a second interchangeable filter unit 116, and a detector element 118. The objective 114 receives the fluorescence light emitted by the excited fluorophores and directs the fluorescence light into a detection beam path 120. The second interchangeable filter unit 116 comprises two or more filters which block all wavelengths of the fluorescence light except for a single wavelength or a range of wavelengths in order to generate different detection lights. One of the filters at a time is brought into the detection beam path 120 by the second interchangeable filter unit 116 to produce a specific detection light that is further directed along the detection beam path 120 towards the detector element 118. A detection filter setting defines which of the filters is currently brought into the detection beam path 120. By blocking unwanted wavelengths of the fluorescence light, it can be ensured that only the fluorescence light emitted by a single fluorophore or group of fluorophores is detected by the detector element 118.

In an alternative embodiment, the optical detection system 112 may comprise two or more different detector elements. Each detector element is sensitive to a single wavelength or a range of wavelengths in order to detect the fluorescence light emitted by a single fluorophore or group of fluorophores. In this alternative embodiment, the second interchangeable filter unit 116 may be omitted and/or replaced by different filters, each of which is position before a different detector element.

In the present embodiment, a beam splitter 122 is located at an intersection of the illumination beam path 110 and the detection beam path 120, which are perpendicular to each other in the present embodiment. The beam splitter 122 is configured such that the excitation light is directed into the sample 102 via the objective 114. The beam splitter 122 is further configured such that the fluorescence light received by the objective 114 is directed towards the second interchangeable filter unit 116.

The fluorescence microscope system 100 further comprises a control unit 124, an input unit 126, and an output unit 128. The control unit 124 is connected to the illumination system 104, the optical detection system 112, the input unit 126, and the output unit 128. The control unit 124 is configured to set parameters of the illumination system 104 and the optical detection system 112 based on for example a user input via the input unit 126. The control unit 124 is also configured to output an image or images of the sample 102 generated based on fluorescence light emitted by the excited fluorophores via the output unit 128. The control unit 124 is further configured to determine whether the sample 102 is better imaged in a concurrent imaging mode or in a sequential imaging mode, and to output the result of that determination via the output unit 128. In the concurrent imaging mode, the different fluorophores are imaged simultaneously. In the sequential imaging mode, the different fluorophores are divided into a first group and at least one second group, and the fluorophores of the first and second groups are imaged subsequently. An exemplary embodiment of the method for determining whether to image the sample 102 in a concurrent imaging mode or in a sequential imaging mode is described below with reference to FIGS. 2 to 6.

Figure 2:
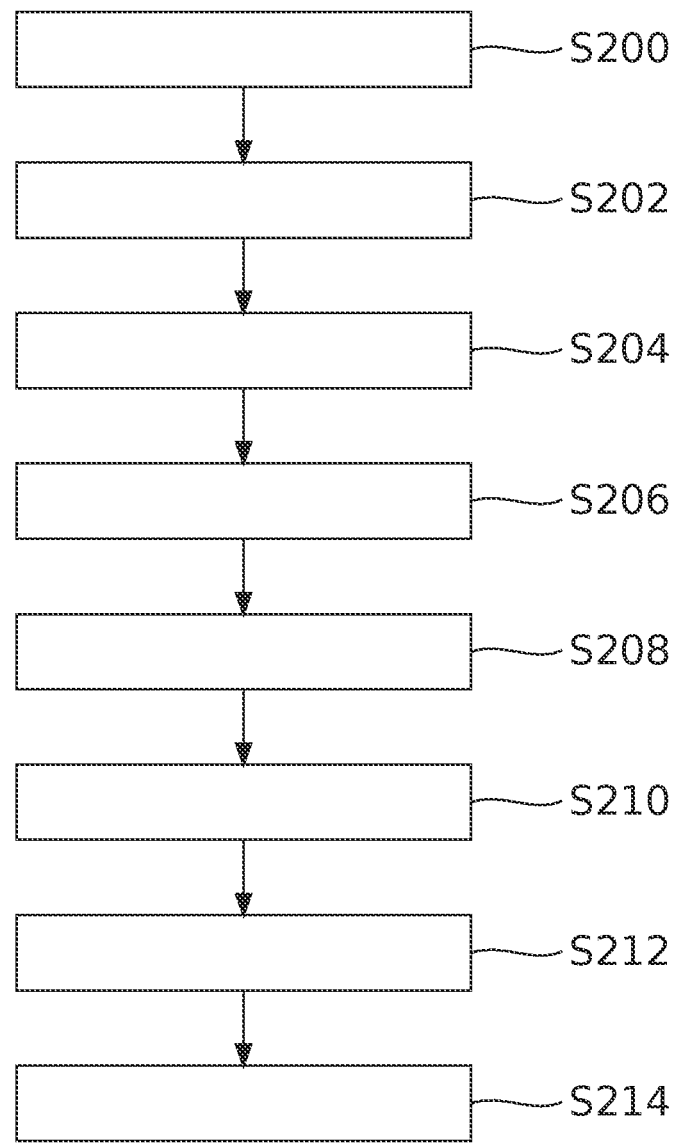
FIG. 2 is a flowchart of a method for determining whether to image the sample in a concurrent imaging mode or in a sequential imaging mode with the fluorescence microscope system according to FIG. 1.

FIG. 2 is a flowchart of a method for determining whether to image the sample 102 in a concurrent imaging mode or in a sequential imaging mode with the fluorescence microscope system 100 described above.

In step S200, the process is started. In step S202, the control unit 124 receives a set of parameters upon which the determination is based. The set of parameters may include at least one characteristic of each of the different fluorophores located inside the sample 102, at least one characteristic of the sample 102 itself, at least one parameter of the optical detection system 112 and/or at least one parameter of the illumination system 104. The parameters may be entered into the control unit 124 by the user or may be received by the control unit 124 for example from the illumination system 104 and/or optical detection system 112.

In step 204, a first sub-process is executed. In the first sub-process the control unit 124 determines whether to image the sample 102 in the concurrent imaging mode or in the sequential imaging mode based on at least one parameter of the illumination system 104. The first sub-process is described in more detail below with reference to FIG. 3.

In step 206, a second sub-process is executed. In the second sub-process the control unit 124 determines whether to image the sample 102 in the concurrent imaging mode or in the sequential imaging mode based on at least one parameter of the optical detection system 112. The second sub-process is described in more detail below with reference to FIG. 4.

In step 208, a third sub-process is executed. In the third sub-process the control unit 124 determines whether to image the sample 102 in the concurrent imaging mode or in the sequential imaging mode based on at least one characteristic of each of the different fluorophores. The second sub-process is described in more detail below with reference to FIG. 5.

The steps S204, S206, and S208 can be performed in any order or concurrently. If the control unit 124 has determined in any of the steps S204, S206, or S208 that the sample 102 is best imaged in the sequential imaging mode, the control unit 124 outputs this result in step S210 via the output unit 128 in order to inform the user. Otherwise, the control unit 124 outputs that the sample 102 may be imaged in the concurrent imaging mode via the output unit 128 and/or proceed with imaging the sample 102 in the concurrent imaging mode in step 212. The process is finished in step S214.

Figure 3:
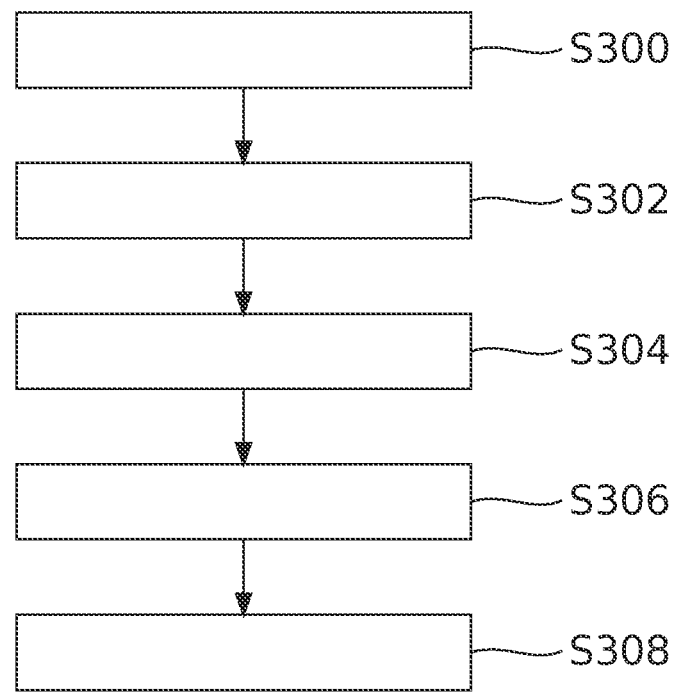
FIG. 3 is a flowchart of a first sub-process of the method of FIG. 2.

FIG. 3 is a flowchart of the first sub-process of the method described above.

In step 300, the first sub-process is started. In step 302, the control unit 124 determines a minimum value and a maximum value of a power of the light source 106 of the illumination system 104 based on at least one characteristic of each of the different fluorophores and/or at least one characteristic of the sample 102. In step 304, the control unit 124 compares the minimum value and the maximum value to a working range of the light source 106. If either of the maximum value and the minimum value is outside the working range of the light source 106, the control unit 124 decides to image the sample 102 in the sequential imaging mode. In other words, the determination which imaging mode to use is based on the dynamic range of the light source 106. If the fluorescence microscope system 100 comprises more than one light source 106, step 304 is repeated for each light source 106.

In step 306, the control unit 124 determines whether the different fluorophores can all be excited by the excitation light currently emitted by the illumination system 104. If the different fluorophores cannot all be excited by the same excitation light, i.e. if different excitation filter settings or light sources 106 have to be used, the control unit 124 determines that the sample 102 has to be imaged in the sequential imaging mode.

The steps 302, 304, and 306 can be performed in any order or concurrently. The first sub-process is finished in step S308.

Figure 4:
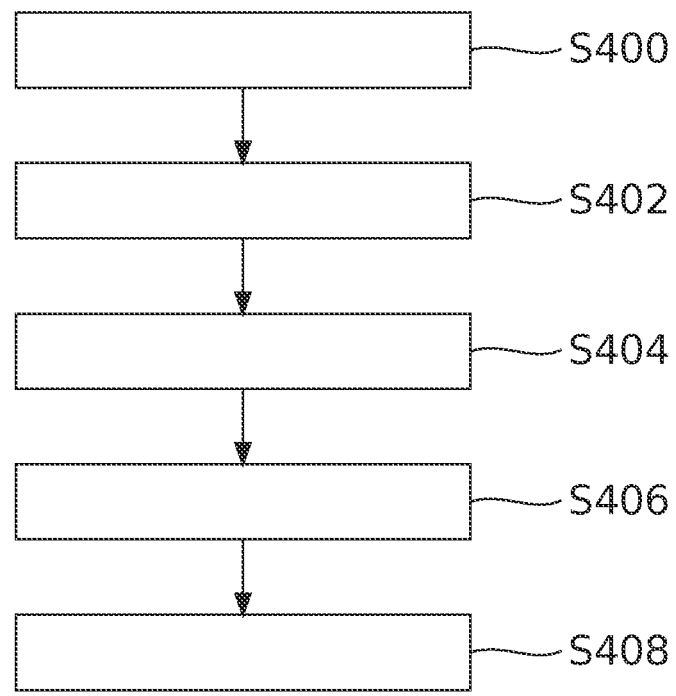
FIG. 4 is a flowchart of a second sub-process of the method of FIG. 2.

FIG. 4 is a flowchart of the second sub-process of the method described above.

In step 400, the second sub-process is started. In step 402, the control unit 124 determines how much of the dynamic range of the detector element 118 or detector elements is used based on the emission spectra of the different fluorophores. If the used dynamic range used exceeds a threshold value, the control unit 124 determines that the sample 102 has to be imaged in the sequential imaging mode.

In step 404, the control unit 124 determines whether cross-excitation happens based on the wavelength spectrum of the excitation light or excitation lights used and based on the excitation spectra of the different fluorophores. If significant cross-excitation occurs, the control unit 124 determines that the sample 102 has to be imaged in the sequential imaging mode.

If two or more light sources are used, the control unit 124 determines whether the light sources used over-excite one or more of the different fluorophores in step 406. If over-excitation occurs, the control unit 124 determines that the sample 102 has to be imaged in the sequential imaging mode.

The steps 402, 404, and 406 can be performed in any order or concurrently. The second sub-process is finished in step S408.

Figure 5:
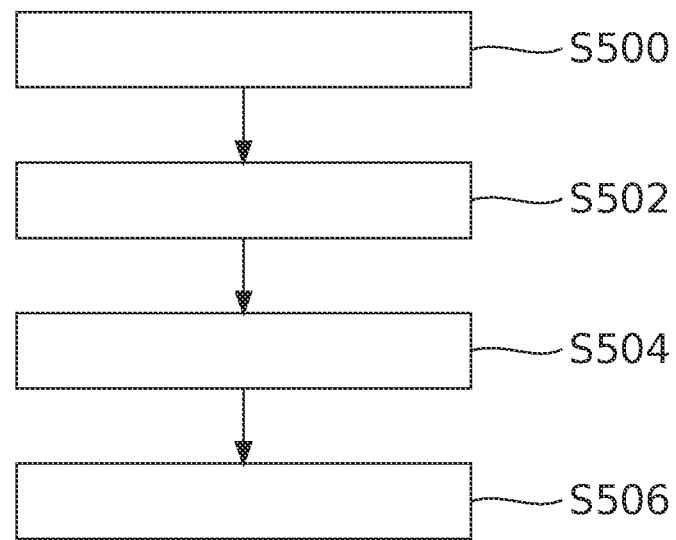
FIG. 5 is a flowchart of a third sub-process of the method of FIG. 2.

FIG. 5 is a flowchart of the third sub-process of the method described above.

In step 500, the third sub-process is started. In step 502, the control unit 124 determines whether the emission spectra of two of more of the different fluorophores overlap within the detection spectrum of the used detector element 118. If there is significant overlap within the detection spectrum and the fluorophores can be excited separately, the control unit 124 determines that the sample 102 has to be imaged in the sequential imaging mode. Step 502 is described in more detail below with reference to FIG. 6.

In step 504, the control unit 124 determines a brightness histogram for each of the different fluorophores. The control unit 124 then compares brightness histograms and if the differences in brightness for two or more of the different fluorophores are above a threshold value, the control unit 124 determines that the sample 102 has to be imaged in the sequential imaging mode.

The steps 502, and 504 can be performed in any order or concurrently. The second sub-process is finished in step S506.

Figure 6:
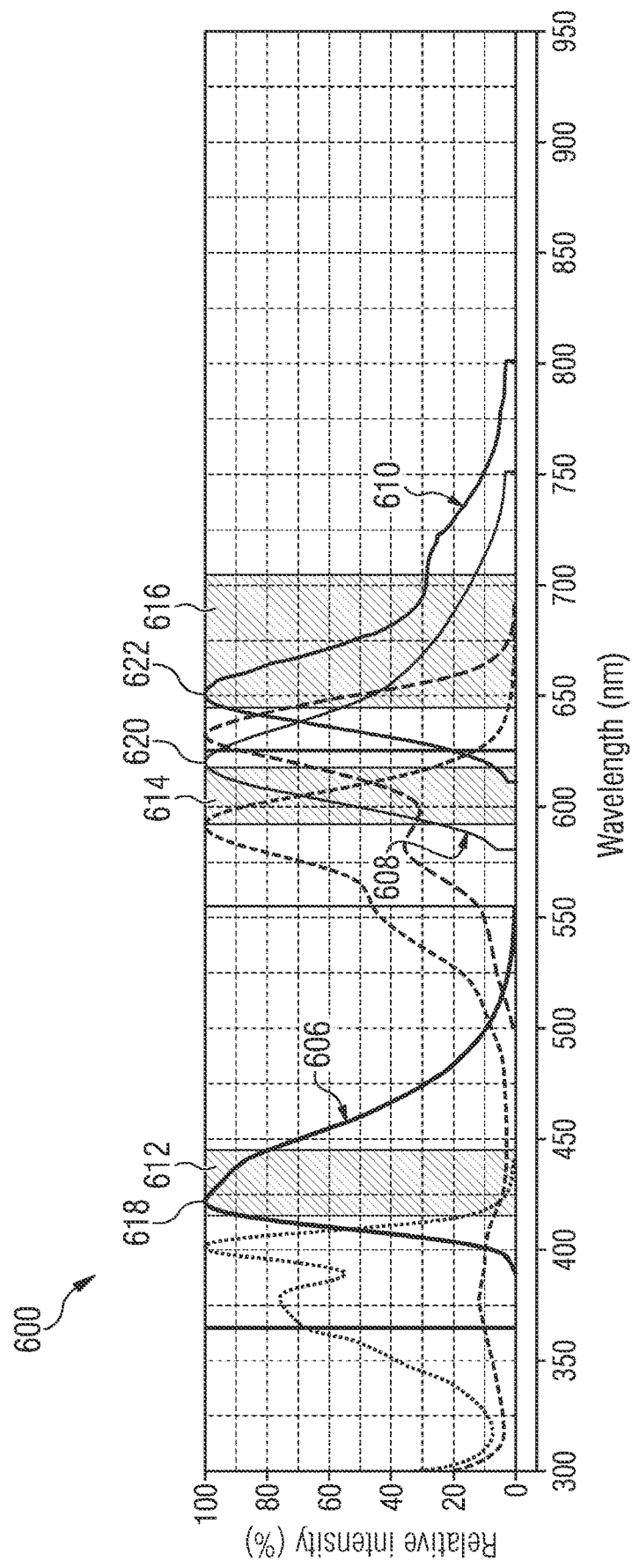
FIG. 6 is a diagram showing emission spectra of different fluorophores.

FIG. 6 is a diagram 600 showing the emission spectra of different fluorophores.

The abscissa 602 of the diagram 600 denotes a wavelength in nm. The ordinate 604 of the diagram 600 denotes a relative intensity in percent. The emission spectra 606, 608, 610 of three different exemplary fluorophores are shown as solid lines. Three detection wavelength ranges 612, 614, 616 of three exemplary detectors are denoted by solid rectangles. As can be seen in FIG. 6, the emission maximum 618 of a first fluorophore is within the detection wavelength range 612 of a first detector, the emission maximum 620 of a second fluorophore is within the detection wavelength range 614 of a second detector, and the emission maximum 622 of a third fluorophore is within the detection wavelength range 616 of a third detector. However, there is a significant overlap between the emission spectra 608, 610 of the second and third fluorophores within the detection wavelength range 616 of the third detector. In particular, if the signal of the second fluorophore is weaker than the signal of the third fluorophore, further processing for example by spectral unmixing may be difficult. In this case, the control unit 124 will determine to image the sample 102 in the sequential imaging by imaging the first and third fluorophores in a first image and the second fluorophore subsequently in a second image. In this embodiment, the first and third fluorophores are in the first group while the second fluorophore is in the second group.

Identical or similarly acting elements are designated with the same reference signs in all Figures. As used herein the term "and/or" includes any and all combinations of one or more of the associated listed items and may be abbreviated as "/".

Although some aspects have been described in the context of an apparatus, it is clear that these aspects may also represent a description of the corresponding method, where a block or device corresponds to a method step or a feature of a method step. Analogously, aspects described in the context of a method step may also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

| | |
|---|---|
| 100 | Microscope system |
| 102 | Sample |
| 104 | Illumination system |
| 106 | Light source |
| 108 | Interchangeable filter unit |
| 110 | Illumination beam path |
| 112 | Optical detection system |
| 114 | Objective |
| 116 | Second interchangeable filter unit |
| 118 | Detector element |
| 120 | Detection beam path |
| 122 | Beam splitter |
| 124 | Control unit |
| 126 | Input unit |
| 128 | Output unit |
| 600 | Diagram |
| 602 | Abscissa |
| 604 | Ordinate |
| 606, 608, 610 | Emission spectra |
| 612, 614, 616 | Detection wavelength range |
| 618, 620, 622 | Emission maximum |

The invention claimed is:

1. A fluorescence microscope system for imaging a sample comprising at least two different fluorophores, the fluorescence microscope system comprising:
an illumination system configured to emit illumination light for exciting the at least two different fluorophores;
an optical detection system configured to generate images of the sample based on fluorescence light emitted by the excited at least two different fluorophores; and
a control unit configured to determine whether to image the sample in a concurrent imaging mode or in a sequential imaging mode, based on at least one characteristic of each of the at least two different fluorophores, at least one parameter of the optical detection system, and at least one parameter of the illumination system,
wherein in the concurrent imaging mode, the at least two different fluorophores are imaged simultaneously,
wherein in the sequential imaging mode, the at least two different fluorophores are divided into a first group and at least one second group, and fluorophores of the first group and fluorophores of the at least one second group are imaged sequentially, and
wherein the control unit is configured to determine whether to image the sample in the concurrent imaging mode or in the sequential imaging mode by:
determining a minimum value and a maximum value of a power of at least one light source of the illumination system based on at least one characteristic of each of the at least two different fluorophores and/or at least one characteristic of the sample,
comparing a working range of the power of the at least one light source to the minimum value and the maximum value, and
upon determining that at least one of the minimum value or the maximum value is outside the working range of the power of the at least one light source, determining to image the sample in the sequential mode.

2. The fluorescence microscope system according to claim 1, wherein the control unit is configured to divide the at least two different fluorophores into the first group and the at least one second group based on at least one characteristic of each of the at least two different fluorophores.

3. The fluorescence microscope system according to claim 2, wherein the control unit is configured to divide the at least two different fluorophores into the first group and the at least one second group such that emission spectra of the at least two different fluorophores within each of the first group and the at least one second group have a minimal overlap.

4. The fluorescence microscope system according to claim 1, wherein the control unit is configured to determine whether to image the sample in the sequential imaging mode or in the concurrent imaging mode based on excitation spectra of the at least two different fluorophores.

5. The fluorescence microscope system according to claim 1, wherein the control unit is configured to determine whether to image the sample in the sequential imaging mode or in the concurrent imaging mode based on a spectrum of excitation light emitted by the illumination system.

6. The fluorescence microscope system according to claim 1, wherein the control unit is configured to determine whether to image the sample in the sequential imaging mode or in the concurrent imaging mode by comparing an excitation spectra of the at least two different fluorophores to a spectrum of excitation light emitted by the illumination system.

7. The fluorescence microscope system according to claim 1, wherein the control unit is configured to determine whether to image the sample in the sequential imaging mode or in the concurrent imaging mode based on emission spectra of the at least two different fluorophores.

8. The fluorescence microscope system according to claim 1, wherein the control unit is configured to determine whether to image the sample in the sequential imaging mode or in the concurrent imaging mode by comparing an overlap of emission spectra of the at least two different fluorophores to a detection spectrum of the optical detection system.

9. The fluorescence microscope system according to claim 1, wherein the control unit is configured to determine whether to image the sample in the sequential imaging mode or in the concurrent imaging mode by comparing a brightness value of at least two of the at least two different fluorophores.

10. The fluorescence microscope system according to claim 1, wherein the control unit is configured to determine whether to image the sample in the sequential imaging mode or in the concurrent imaging mode based on a dynamic range of at least one detector of the optical detection system.

11. The fluorescence microscope system according to claim 1, wherein in the sequential imaging mode, the illumination system subsequently emits a first illumination light for exciting the fluorophores of the first group and at least one second illumination light for exciting the fluorophores of the at least one second group; and wherein in the concurrent imaging mode the illumination system emits a third illumination light for exciting the at least two different fluorophores simultaneously.

12. The fluorescence microscope system according to claim 1, wherein the control unit is configured to determine whether to image the sample in the sequential imaging mode or in the concurrent imaging mode based on at least one characteristic of the sample.

13. The fluorescence microscope system according to claim 1, wherein the control unit is configured to set at least one parameter of the optical detection system and/or at least one parameter of the illumination system based on at least one characteristic of each of the at least two different fluorophores and/or at least one characteristic of the sample.

14. The fluorescence microscope system according to claim 1, wherein the control unit is configured to give a feedback to a user based upon a determination by the control unit that the sample is to be imaged in the sequential imaging mode.

15. A method for imaging a sample comprising at least two different fluorophores using a fluorescence microscope system, the method comprising:
   determining, using a control unit, whether to image the sample in a concurrent imaging mode or in a sequential imaging mode, based on at least one characteristic of each of the at least two different fluorophores, at least one parameter of an optical detection system of the fluorescence microscope system, and at least one parameter of an illumination system of the fluorescence microscope system, wherein the determining whether to image the sample in the concurrent imaging mode or in the sequential imaging mode comprises:
      determining a minimum value and a maximum value of a power of at least one light source of the illumination system based on at least one characteristic of each of the at least two different fluorophores and/or at least one characteristic of the sample,
      comparing a working range of the power of the at least one light source to the minimum value and the maximum value, and
      upon determining that at least one of the minimum value or the maximum value is outside the working range of the power of the at least one light source, determining to image the sample in the sequential mode;
   imaging the at least two different fluorophores simultaneously based on a determination that the sample is to be imaged in the concurrent imaging mode; and
   dividing the at least two different fluorophores into a first group and at least one second group, and imaging fluorophores of the first group and fluorophores of the at least one second group sequentially based on a determination that the sample is to be imaged in the sequential imaging mode.

* * * * *